Jan. 11, 1938.  J. G. JACKSON ET AL  2,105,421
MOUNTING MEANS FOR ENCLOSED ELECTRIC DEVICES
Filed April 7, 1937  2 Sheets-Sheet 1
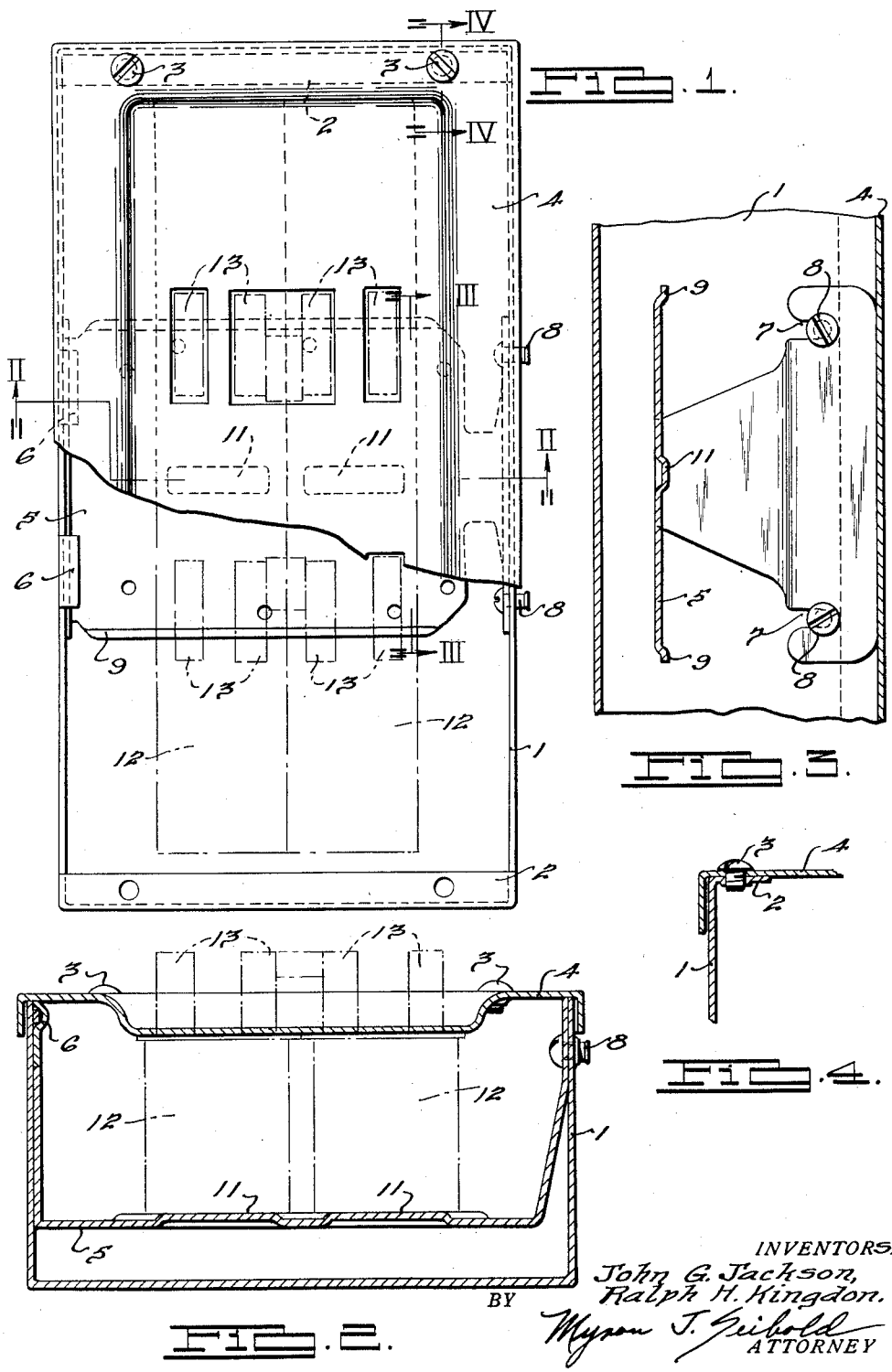
INVENTORS.
John G. Jackson,
Ralph H. Kingdon.
BY Myron J. Siebold
ATTORNEY Jan. 11, 1938.  J. G. JACKSON ET AL  2,105,421
MOUNTING MEANS FOR ENCLOSED ELECTRIC DEVICES
Filed April 7, 1937   2 Sheets-Sheet 2
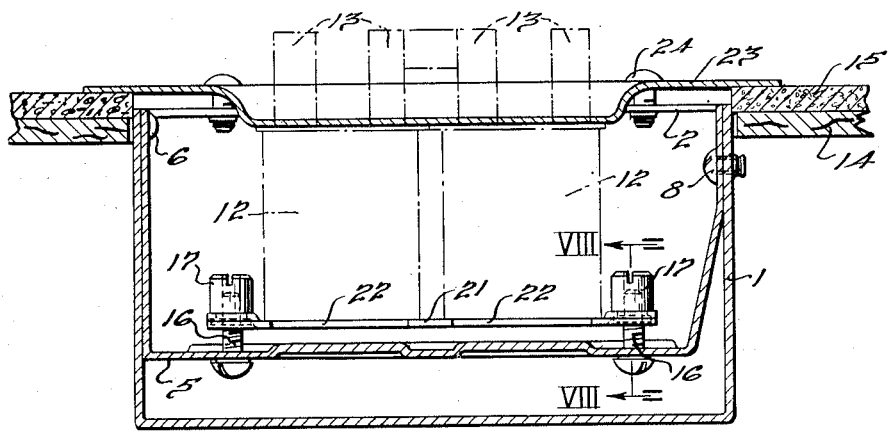
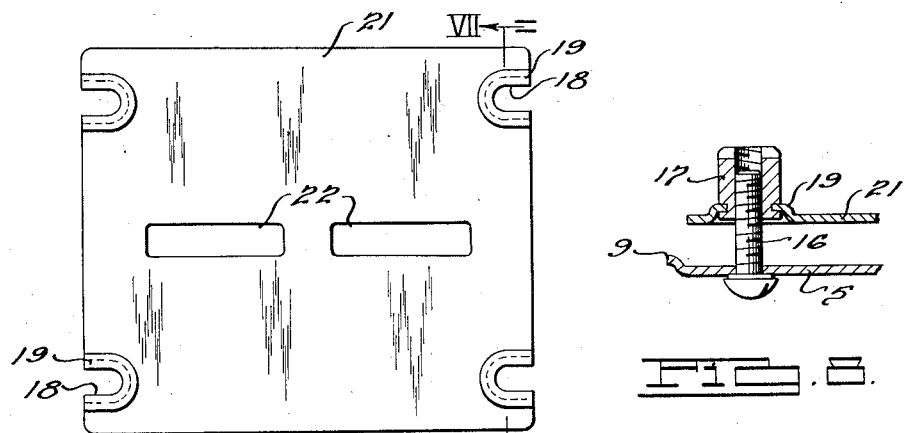
INVENTORS.
John G. Jackson,
Ralph H. Kingdon.
BY
ATTORNEY Patented Jan. 11, 1938

2,105,421

UNITED STATES PATENT OFFICE 2,105,421

MOUNTING MEANS FOR ENCLOSED ELECTRIC DEVICES

John G. Jackson and Ralph H. Kingdon, Detroit, Mich., assignors to Square D Company, Detroit, Mich., a corporation of Michigan Application April 7, 1937, Serial No. 135,367

6 Claims. (Cl. 247—19)

This invention relates to means for mounting an electric circuit instrumentality within an enclosed box and has for its object the provision of a mounting pan which shall be adapted for use with both flush and surface mounted enclosures.

Another object of the invention is to provide an improved adjustable mounting for an electric instrumentality within a flush mounted enclosure.

Another object of the invention is to provide a hinge pan supporting an electric circuit instrumentality within an enclosing box for supported swinging movement to the exterior thereof and having common parts suitable for both flush and surface mounted enclosures.

Another object of the invention is the provision of a hingedly mounted pan for removably supporting an electric circuit breaker within an enclosing box which pan shall in itself support the circuit breaker in the correct position for a surface mounted enclosure and which pan with the addition of certain elements will adjustably support the circuit breaker in any desired position for a flush mounted enclosure.

Other objects and features of the invention will be readily apparent to those skilled in the art from the following specification and appended drawings illustrating certain preferred embodiments of the invention in which:

Figure 1 is a front elevational view of the mounting means according to the present invention applied to surface mounting enclosures with a portion of the cover broken away to show internal parts.

Figure 2 is an enlarged horizontal sectional view on the line II—II of Figure 1.

Figure 3 is an enlarged partial sectional view on the line III—III of Figure 1.

Figure 4 is a detailed sectional view on the line IV—IV of Figure 1 showing the method of cover attachment.

Figure 5 is a sectional view similar to Figure 2 showing the mounting arrangement as applied to a flush mounted enclosure.

Figure 6 is a detail of the mounting plate shown in Figure 5.

Figure 7 is a sectional view on the line VII—VII of Figure 6.

Figure 8 is a detailed sectional view on the line VIII—VIII of Figure 5.

The surface mounted enclosure arrangement illustrated in Figures 1 to 4 inclusive embodies an enclosing box 1 having top and bottom flanges 2 at its front provided with threaded openings receiving studs 3 attaching the cover 4 to the box.

Within the box is disposed a generally U-shaped mounting pan 5 engaging the opposite side walls of the box and hingedly mounted as at 6 to the front edge of one side wall. The opposite side of the mounting pan is formed as shown in Figure 3 with the notches 7 engaging with studs 8 on the inside wall of the box to limit the interior swinging movement of the mounting pan and to hold and support the pan within the box. The top and bottom edges of the pan 5 are provided with forwardly extending lip portions 9 spaced from the main plane of the pan bottom a distance equal to the thickness of the adjustable mounting plate used with flush type mountings to be hereinafter described. For greater mechanical strength the central portion of the pan is provided with pressed out portions 11 extending forwardly the same distance as the lips 9. Rigidly mounted upon the pan are the electric circuit instrumentalities 12 which may be in the form of enclosed electric circuit breakers of the type illustrated in the copending applications of John G. Jackson, Serial No. 36,247 filed August 15, 1935; Serial No. 72,035 filed April 1, 1936; Serial No. 77,519 filed May 2, 1936; all entitled Circuit breakers, and in the divisions and continuations of these applications. These circuit breakers are provided with handle arrangements indicated generally at 13 and the cover 4 is provided with suitable openings receiving and embracing the handles to permit access to the handles in front of the cover and at the same time easy removability of the cover without disturbing the handles. When mounted on the pan the instrumentalities 12 will be supported upon the lips 9 and pressed out portions 11 and will be supported within the box at the correct height to be engaged by the inward draw on the cover 4 as shown in Figure 2 when the cover is in place on the box. Loosening of the studs 8 permits the pan 5 and the instrumentalities mounted thereon to be swung to the exterior of the box upon the hinge mounting 6 to permit free access to the interior of the box for the drawing in of wires and the attachment of conduit and other manipulations.

Figure 5 illustrates the mounting pan used with an adjustable plate supporting arrangement for flush mounted boxes. In the type previously described the entire box is adapted to be mounted against an exterior wall while in that shown in Figure 5 the box is buried in back of the wall and the front plate or cover only is placed against the exterior surface of the wall. As illustrated, the lathing and plaster of the wall are represented at 14 and 15 respectively and this arrangement utilizes the same outer box 1 having the flange 2 and the identical pan 5 hingedly mounted to the box as at 6 and having the limiting and holding studs 8 previously described. However, in this arrangement, studs 16 are threaded forwardly in the pan and receive thereon the adjusting nuts 17. These nuts are provided with grooves adjacent their back portion as more particularly shown in Figure 8 which receives slots 18 in the pressed out portions 19 of a mounting plate 21. The mounting plate 21 is provided with two holes 22 adjacent its central portion which are shaped to receive the pressed out portions 11 on the pan 5. With this arrangement it is seen that the plate 21 is securely supported on the plate 5 and cannot be removed without entire removal of a set of the adjusting nuts 17. The width of the pan 21 is such that it terminates short of the lips 9 as shown in Figure 8 and it has the openings 22 receiving the pressed out portions 11 so that when the nuts 17 are screwed back the instrumentalities 12 on the pan 21 will be mounted in exactly the same position relative to the box as when directly mounted on the pan for the surface type mounting. This is attained by the interfitting pressed out portions and openings on the pan 5 and plate 21 and the arrangement of the pressed out portions on the pan 5 to have a forward extension equal to or greater than the thickness of the plate 21.

In the flush type mounting of Figure 5 it is impossible, when mounting the box, to arrange to accommodate the thickness of the exterior wall which is usually placed on after the box is installed and may be of varying thickness. The adjustable mounting shown permits the positioning of the instrumentalities 12 within the box in a position to just engage the draw on the cover 23 when it is drawn flat against the exterior surface of the plaster 15 on the wall by the studs 24 threading into the flanges 2 on the box 1. It is seen by this arrangement that provision is made for the use of a common mounting pan for both flush and surface mounted enclosures which utilizes the pan in its simplest form for the surface mounted enclosure and adds only additional parts without changing the form of the pan itself to provide for adjustable mounting for the flush mounted enclosure and that the arrangement is such that even though a common pan is used the adjustable mounting permits the instrumentality to assume the same position in the box, if desired, as it had when mounted directly on the pan for the surface mounted enclosure. The use of the common pan results in desirable economy in manufacture due to the use of standardized parts and the interfitting arrangement enables the securing of the same position on the adjustable mounting as on the plain mounting to accommodate the cases where the box is properly positioned so that the cover 23 in the flush type mounting directly engages the top of the box.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What is claimed is:

1. Supporting and enclosing means for an electric circuit controlling instrumentality adapted for both flush and surface mounting comprising an enclosing box and a supporting pan within the box having portions projecting a short distance in front of the plane of the pan, said instrumentalities being directly supported upon said projections for the surface mounted enclosure, and an auxiliary supporting plate adapted to be supported on said pan and adjustable relative thereto, said plate carrying said instrumentalities for flush type mounting, said plate having portions interfitting with said projections on the pan so that in the back position of the plate the instrumentalities will be supported in the same position as when directly supported on said projections.

2. Supporting and enclosing means for a circuit controlling instrumentality comprising an enclosing box and a supporting pan within said box adapted for use with both flush and surface mounting of the enclosure, said pan directly supporting said instrumentality for surface mounting, and an auxiliary plate adjustably supporting said instrumentality from the pan for flush type mounting, said pan and plate being so formed that in one extreme adjustment of the plate the instrumentality is supported in the same position as when directly supported on the pan.

3. Supporting and enclosing means for an electric circuit controlling instrumentality comprising an enclosing box adapted for flush and surface mounting, a supporting pan hingedly mounted within the box for swinging movement to the exterior thereof to uncover the box interior, said pan being used for both flush and surface mounting, with the instrumentality directly supported on the pan for surface mounting and with means adjustably supporting the instrumentality on the pan for flush mounting, said means and pan having cooperating portions whereby in one extreme of adjustment of the plate the instrumentality will be supported in the same position as when supported directly on the pan.

4. Supporting and enclosing means for an electric circuit controlling instrumentality adapted for flush and surface mounting comprising an enclosing box, a supporting pan within said box adapted to directly support the instrumentality for surface mounting, a plurality of studs secured to said pan and directed forwardly thereof, a plurality of nuts received on said studs, a supporting plate mounted on said nuts and adapted to support said instrumentality for flush mounting, said plate and pan having cooperating portions whereby in the back position of said plate the instrumentality is in the same position as when directly mounted on the pan.

5. Supporting and enclosing means for electric circuit controlling instrumentalities adapted for flush and surface mounting comprising an enclosing box adapted for attachment to both flush and surface covers as desired, a supporting pan within the box hingedly mounted thereto for swinging movement to the exterior thereof, portions on said pan projecting a short distance beyond the plane of the pan, said portions being adapted to directly support the instrumentality for surface mounting, a supporting plate adjustable relative to the pan and adapted to support the circuit controlling instrumentalities for flush mounting, said plate having clearance portions cooperating with said projecting portions on the pan whereby in the back position of the plate the instrumentality will assume the same position as when mounted directly on the projecting portions.

6. Supporting and enclosing means for electric circuit controlling instrumentalities as defined in claim 5 in which said pan carries forwardly extending studs and said plate is provided with slots slidably and rotatably receiving groove portions of nuts disposed on said studs to provide means for adjusting the plate relative to the pan.

JOHN G. JACKSON.
RALPH H. KINGDON.